(12) United States Patent  
Fujisawa

(10) Patent No.: US 7,412,526 B2  
(45) Date of Patent: Aug. 12, 2008

(54) INFORMATION PROCESSING APPARATUS, INFORMATION PROCESSING METHOD, AND PROGRAM

(75) Inventor: Naoki Fujisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 792 days.

(21) Appl. No.: 10/235,511

(22) Filed: Sep. 5, 2002

(65) Prior Publication Data

US 2003/0065797 A1  Apr. 3, 2003

(30) Foreign Application Priority Data

Sep. 7, 2001 (JP) ............... 2001-271346

(51) Int. Cl.
*G06F 15/16* (2006.01)
(52) U.S. Cl. ..................... 709/229; 709/205
(58) Field of Classification Search ............. 709/229, 709/205
See application file for complete search history.

(56) References Cited

U.S. PATENT DOCUMENTS 5,880,731 A * 3/1999 Liles et al. ................. 715/758
6,088,731 A * 7/2000 Kiraly et al. ............... 709/229
6,667,967 B1 * 12/2003 Anderson et al. ........... 370/351
6,826,540 B1 * 11/2004 Plantec et al. .............. 705/10
6,920,567 B1 * 7/2005 Doherty et al. ............. 726/22

* cited by examiner

*Primary Examiner*—Nathan J. Flynn
*Assistant Examiner*—Kyung H Shin
(74) *Attorney, Agent, or Firm*—Frommer Lawrence & Haug LLP; William S. Frommer; Ellen Marcie Emas

(57) ABSTRACT

An information processing apparatus is disclosed which includes: an accepting element for accepting an access request from a terminal over a network; a first acquiring element for acquiring information which designates a character unique to the terminal and which is received over the network; a second acquiring element for acquiring character data constituting the character designated by the character-designating information acquired by the first acquiring element; and a transmitting element for transmitting to the terminal over the network the character data acquired by the second acquiring element.

16 Claims, 13 Drawing Sheets

INFORMATION PROCESSING APPARATUS, INFORMATION PROCESSING METHOD, AND PROGRAM

BACKGROUND OF THE INVENTION

The present invention relates to an information processing apparatus, an information processing method, and a program. More particularly, the invention relates to an information processing apparatus, an information processing method, and a program for allowing a personal computer to represent its user symbolically in unified fashion not only when operating on a stand-alone basis with a plurality of programs in use but also when connected with other personal computers over a network.

The Internet coming into general use today has made exchanges of e-mail messages between a plurality of users all but an everyday affair.

In transmitting and receiving e-mails, some Internet service providers and some e-mail application programs are known to let their users display symbolic characters called Post Pets (registered trademark) representing the users on the PC screen. The Post Pet is seen delivering e-mails between the connected users, giving them pleasure in handling their electronic correspondence.

There also exist systems each allowing users to gain access to a specific server in order to share a virtual space with other users who take part in the system. According to such systems, the participating users usually represent themselves as so-called avatars that are active in the shared virtual space.

One disadvantage with the above-mentioned Post Pets and avatars is that they can only be utilized within a single, specific system offering the e-mail and/or virtual space service. It has been impossible to use such alter-ego characters across different systems in unified fashion.

SUMMARY OF THE INVENTION

The present invention has been made in view of the above circumstances, and it is an object of the present invention to provide an apparatus, a method, and a program for allowing user-representing characters to be active in unified fashion across different systems.

In order to achieve the above object, according to a first aspect of the present invention, there is provided an information processing apparatus including: an accepting element for accepting an access request from a terminal over a network; a first acquiring element for acquiring information which designates a character unique to the terminal and which is received over the network; a second acquiring element for acquiring character data constituting the character designated by the character-designating information acquired by the first acquiring element; and a transmitting element for transmitting to the terminal over the network the character data acquired by the second acquiring element.

According to a second aspect of the present invention, there is provided an information processing method for use with an information processing apparatus connected to a terminal via a network, the information processing method including the steps of: accepting an access request from the terminal over the network; firstly acquiring information which designates a character unique to the terminal and which is received over the network; secondly acquiring character data constituting the character designated by the character-designating information acquired in the first acquiring step; and transmitting to the terminal over the network the character data designated by the character-designating information acquired in the second acquiring step.

According to a third aspect of the present invention, there is provided a program for use with a computer which controls an information processing apparatus connected to a terminal via a network, the program causing the computer to execute the steps of: accepting an access request from the terminal over the network; firstly acquiring information which designates a character unique to the terminal and which is received over the network; secondly acquiring character data constituting the character designated by the character-designating information acquired in the first acquiring step; and transmitting to the terminal over the network the character data designated by the character-designating information acquired in the second acquiring step.

According to a forth aspect of the present invention, there is provided an information processing apparatus including: requesting element for requesting the second information processing apparatus via the network to use a character unique to the information processing apparatus; first storing element for storing license information grating the right to use the character; transmitting element for transmitting to the second information processing apparatus over the network the license information stored in the first storing element; and returning element for performing a returning process regarding the license information transmitted by the transmitting element.

According to a fifth aspect of the present invention, there is provided an information processing method for use with an information processing apparatus connected to a second information processing apparatus via a network, the information processing method including the steps of: requesting the second information processing apparatus via the network to use a character unique to the information processing apparatus; storing license information grating the right to use the character; transmitting to the second information processing apparatus over the network the license information stored in the storing step; and performing a returning process regarding the license information transmitted in the transmitting step.

According to a sixth aspect of the present invention, there is provided a program for use with a computer which controls an information processing apparatus connected to a second information processing apparatus via a network, the program causing the computer to execute the steps of: requesting the second information processing apparatus via the network to use a character unique to the information processing apparatus; storing license information grating the right to use the character; transmitting to the second information processing apparatus over the network the license information stored in the storing step; and performing a returning process regarding the license information transmitted in the transmitting step.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

Figure 1:
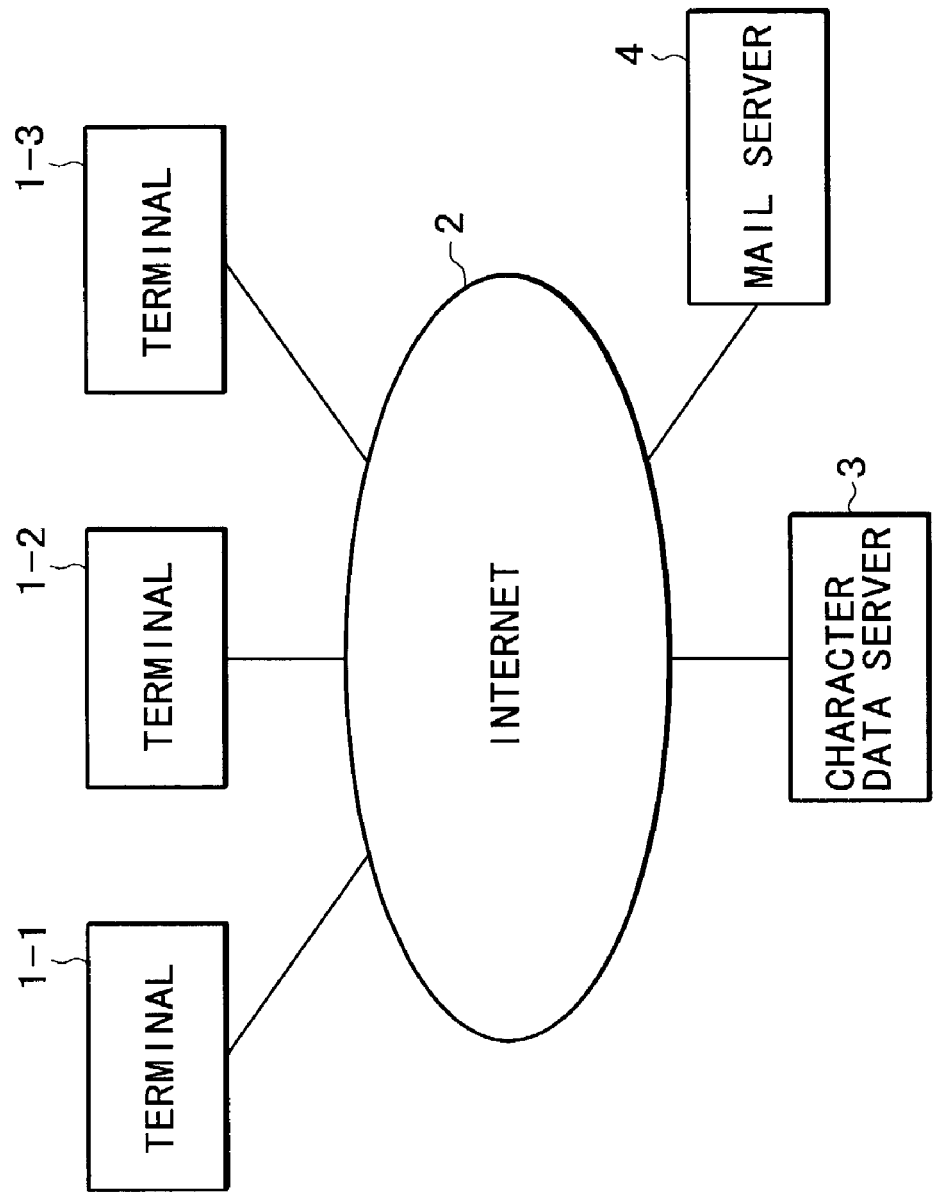
FIG. 1 is a block diagram of a network system to which this invention is applied.

FIG. 1 is a block diagram of a network system to which this invention is applied. In this setup, three terminals 1-1 through 1-3, a character data server 3, and a mail server 4 are connected to the Internet 2.

Figure 2:
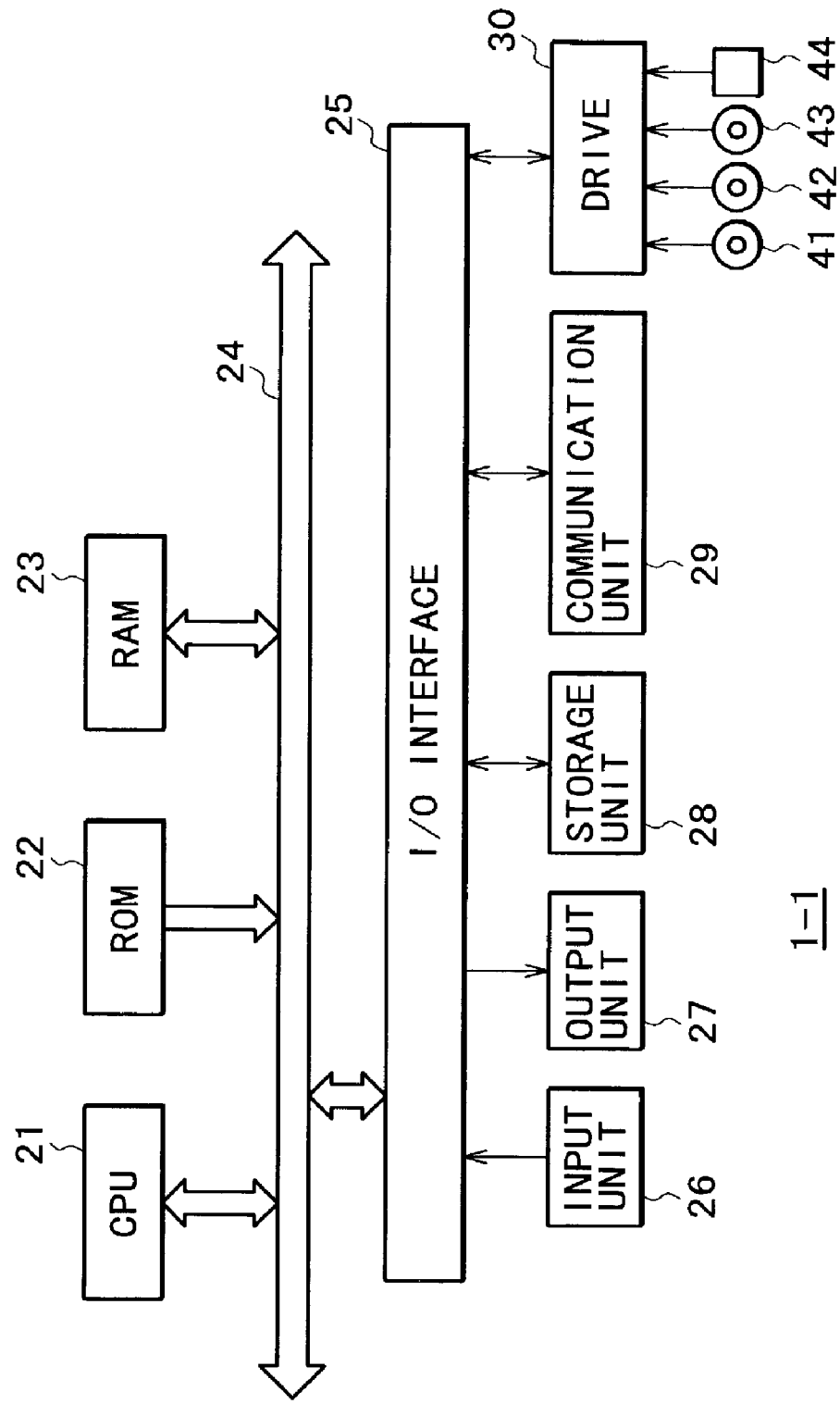
FIG. 2 is a block diagram of a terminal included in the system of FIG. 1.

FIG. 2 is a block diagram indicating a typical structure of the terminal 1-1 (structurally identical to the terminals 1-2 and 1-3, not shown). In FIG. 2, a CPU (Central Processing Unit) 21 carries out various processes in accordance with programs stored in a ROM (Read Only Memory) 22 or those loaded from a storage unit 28 into a RAM (Random Access Memory) 23. On occasion, the RAM 23 accommodates data required by the CPU 21 for its processing.

The CPU 21, ROM 22 and RAM 23 are interconnected via a bus 24. The bus 24 is also connected to an I/O interface 25.

The I/O interface 25 is connected to an input unit 26, an output unit 27, the storage unit 28, and a communication unit 29. The input unit 26 is constituted by a keyboard, a mouse, etc.; the output unit 27 by a display such as a CRT or an LCD and speakers; the storage unit 28 by a hard disc drive; and the communication unit 29 by a modem and a terminal adapter. The communication unit 29 performs communication processes when linked to the Internet 2.

The I/O interface 25 is connected as needed to a drive 30 that may be loaded with a storage medium such as a magnetic disc 41, an optical disc 42, a magneto-optical disc 43, or a semiconductor memory 44. Computer programs retrieved from the loaded storage medium are installed into the storage unit 28 as needed.

Figure 3:
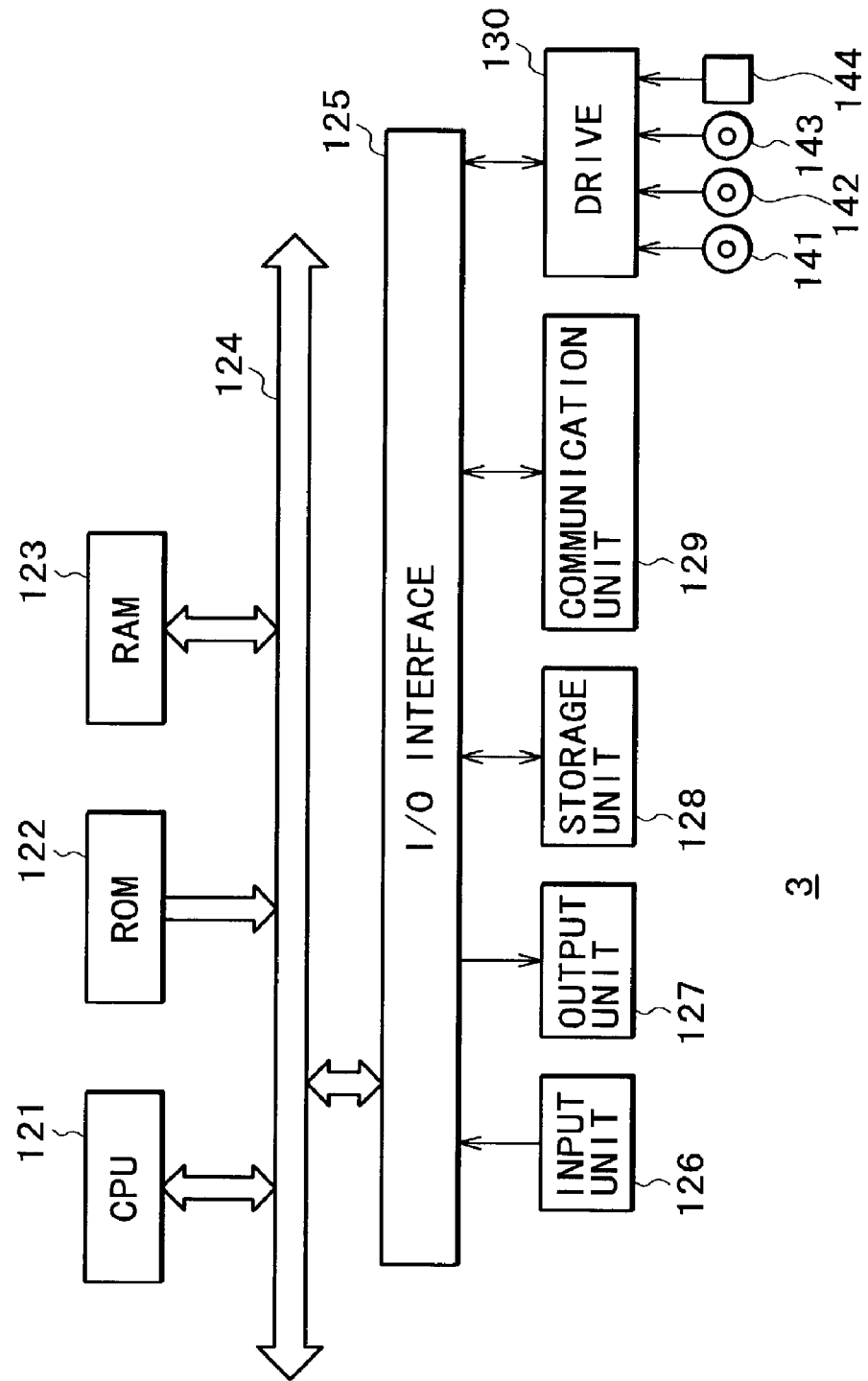
FIG. 3 is a block diagram of a character data server included in the system of FIG. 1.

FIG. 3 is a block diagram showing a typical structure of the character data server 3. The basic structure of the character data server 3 is the same as that of the terminal 1-1 in FIG. 2. The components ranging from a CPU 121 to a semiconductor memory 144 in FIG. 3 are functionally identical to the components from the CPU 21 through the semiconductor memory 44 in FIG. 2.

A mail server 4, although not shown, is the same in basic structure as the character data server 3.

In the above network system, users at the terminals 1-1 through 1-3 purchase user-identifying alter-ego characters (such as the above-mentioned Post Pets or objects acting as avatars, all called "characters" in this specification). Each character is used in unified fashion not only by a plurality of programs running on each user's terminal (one of terminals 1-1 through 1-3) but also upon access to another terminal or another server via the Internet 2.

Figure 4:
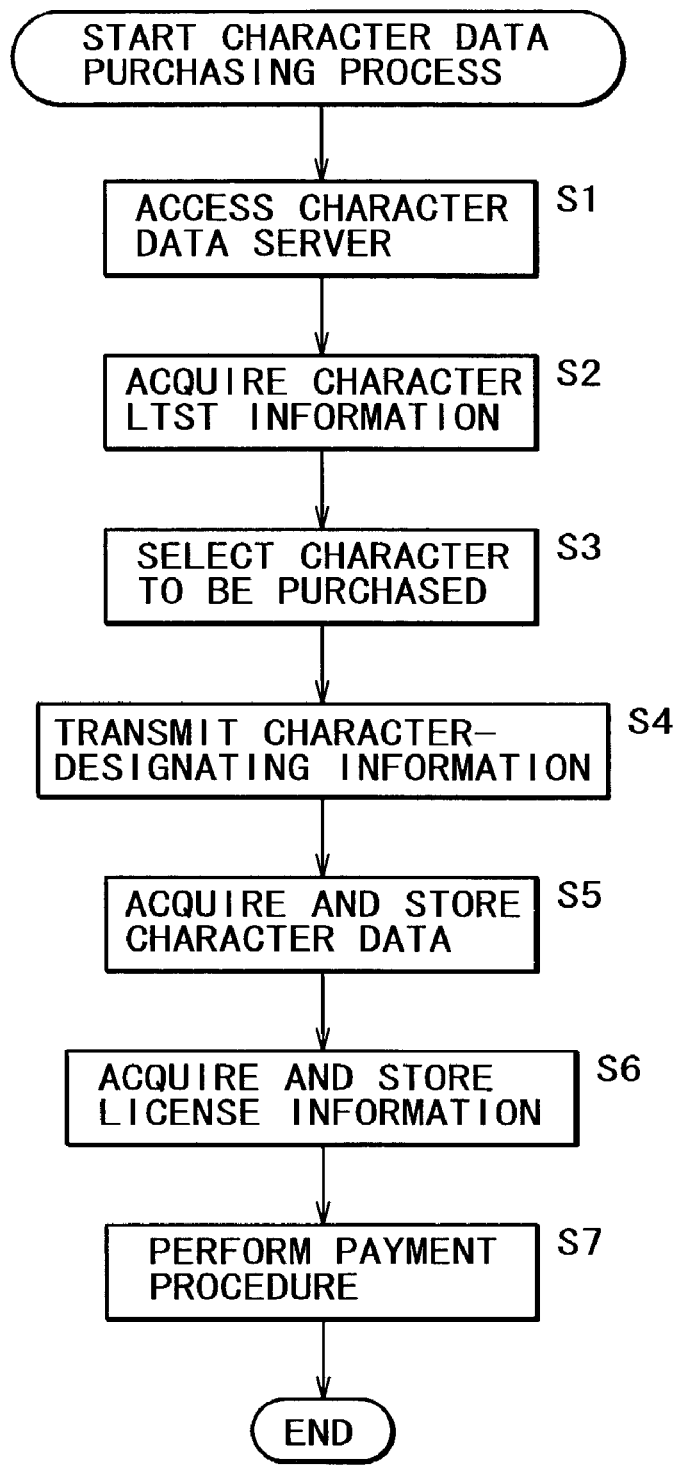
FIG. 4 is s flowchart of steps constituting a character data purchasing process performed by the terminal in FIG. 1.
Figure 5:
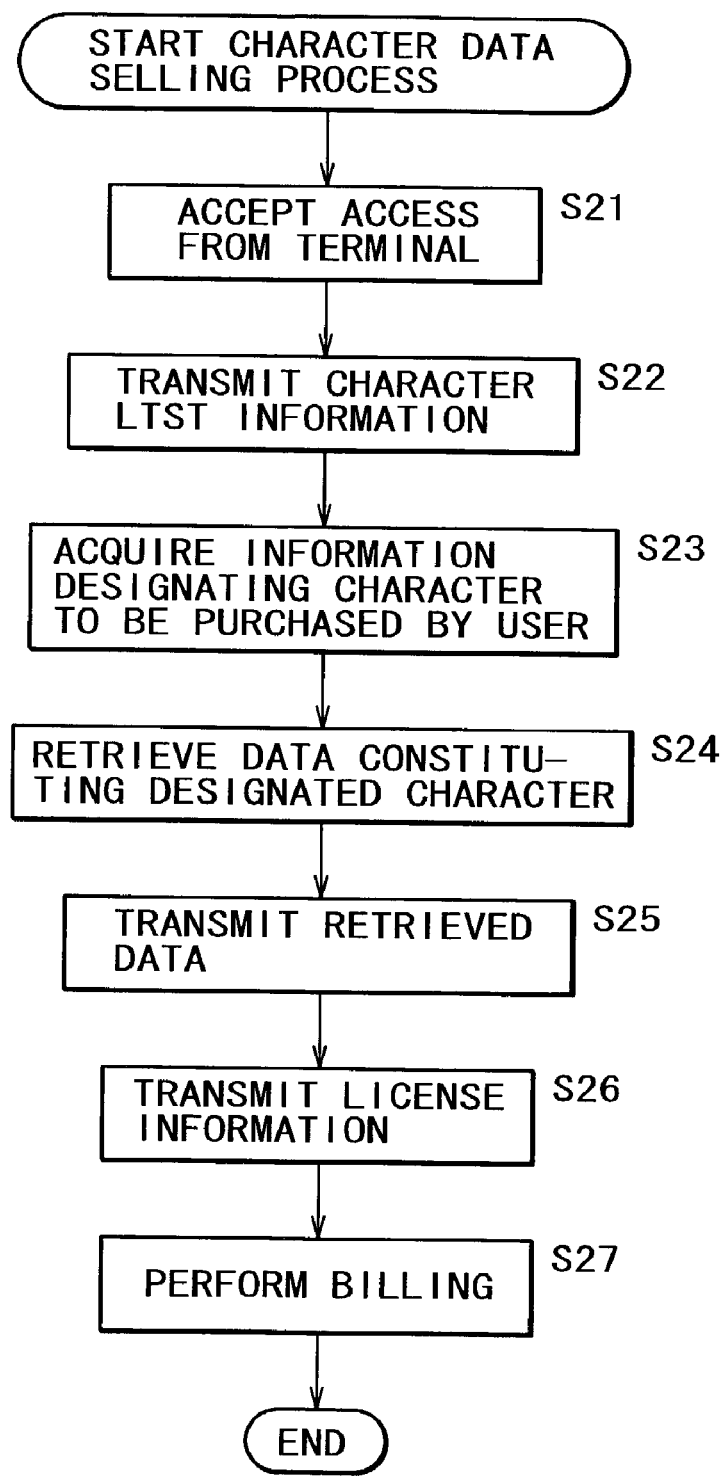
FIG. 5 is a flowchart of steps constituting a character data selling process performed by the character data server in FIG. 1.

Described first with reference to the flowcharts of FIGS. 4 and 5 is how a user at any one of the terminals 1-1 through 1-3 may purchase his or her own character. FIG. 4 shows steps constituting a character data purchasing process performed by a terminal 1-i (i=1, 2, 3). FIG. 5 indicates steps constituting a character data selling process effected by the character data server 3 in response to the user's purchasing action.

Although the ensuing description describes the character data purchasing process performed by the terminal 1-1 only, the same process applies to all other terminals.

Initially, the user operates the input unit 26 so as to order access to the character data server 3. Given the access order, the CPU 21 of the terminal 1-1 in step S1 causes the communication unit 29 to gain access to the character data server 3 over the Internet 2. The access prompts the character data server 3 to transmit character list information, as will be described later (step S22 of FIG. 5). In step S2, the CPU 21 acquires the character list information sent from the character data server 3 through the communication unit 29. The acquired information is output to and displayed on the display constituting part of the output unit 27.

The user selects a desired character from the displayed character list by operating the input unit 26. In step S3, the CPU 21 designates the character to be purchased based on the order from the input unit 26. In step S4, the CPU 21 causes the communication unit 29 to transmit character-designating information designated in step S3 to the character data server 3 over the Internet 2.

Upon receipt of the transmitted character-designating information, the character data server 3 returns character data, as will be described later (step S25 of FIG. 5). In step S5, the CPU 21 acquires the character data sent from the character data server 3 through the communication unit 29, and supplies the acquired data to the storage unit 28 for storage therein. The character data server 3 further returns license information, i.e., information representative of the right to use the character in question (step S26 of FIG. 5). In step S6, the CPU 21 acquires the license information sent from the character data server 3 through the communication unit 29, and supplies the acquired information to the storage unit 28 for storage.

In step S7, the CPU 21 carries out a payment procedure regarding the purchased character data and license information in accordance with the user's input operation made on the input unit 26. More specifically, the user may input, say, a credit card number through the input unit 26. The entered number is transmitted through the communication unit 29 to the character data server 3 for billing purposes.

In keeping with the character data purchasing process described above, the character data server 3 performs the character data selling process outlined in the flowchart of FIG. 5.

In step S21, the CPU 121 of the character data server 3 accepts an access request from the terminal 1-1. In step S22, the CPU 121 retrieves the character list information from the storage unit 128 and causes the communication unit 129 to transmit the retrieved information to the terminal 1-1 over the Internet 2. The storage unit 128 retains data constituting a plurality of characters. Of these stored characters in the storage unit 128, those yet to be sold (i.e., excluding those already sold to other users) are retrieved in list form and transmitted to the connected terminal by the CPU 121. Because no character is sold in duplicate to different users, each user can purchase a unique character as his or her identification symbol in this system. In other words, each user utilizing this system can visually recognize other users by their unique ID characters on display.

After the character list information is transmitted, the terminal 1-1 returns the character-designating information specifying the character to be purchased (step S4 of FIG. 4). In step S23, the CPU 121 acquires the character-designating information. In step S24, the CPU 121 retrieves from the storage unit 128 character data corresponding to the acquired character-designating information. In step S25, the CPU 121 causes the communication unit 129 to transmit the character data retrieved in step S24 to the terminal 1-1 over the Internet 2.

In step S26, the CPU 121 retrieves from the storage unit 128 license information granting the right to use the character data retrieved in step S24, and transmits the retrieved license information to the terminal 1-1 through the communication unit 129.

The terminal 1-1 then returns billing data such as a credit card number (step S7 of FIG. 4). In step S27, the CPU 121 carries out a billing process. More specifically, given the user's credit card number, the CPU 121 makes arrangements to have the fees from the user's bank account for the sold character data and license information.

The steps above are carried out by each of the terminals 1-1 through 1-3. With the process completed, each terminal has its own user-representing character.

In the example of FIGS. 4 and 5, the character data were shown to be purchased from the character data server 3. However, this is not limitative of the invention. Alternatively, users may purchase package media such as CDs, DVDs or semiconductor memories, and may install character data and license information from the purchased media into their terminals.

Figure 6:
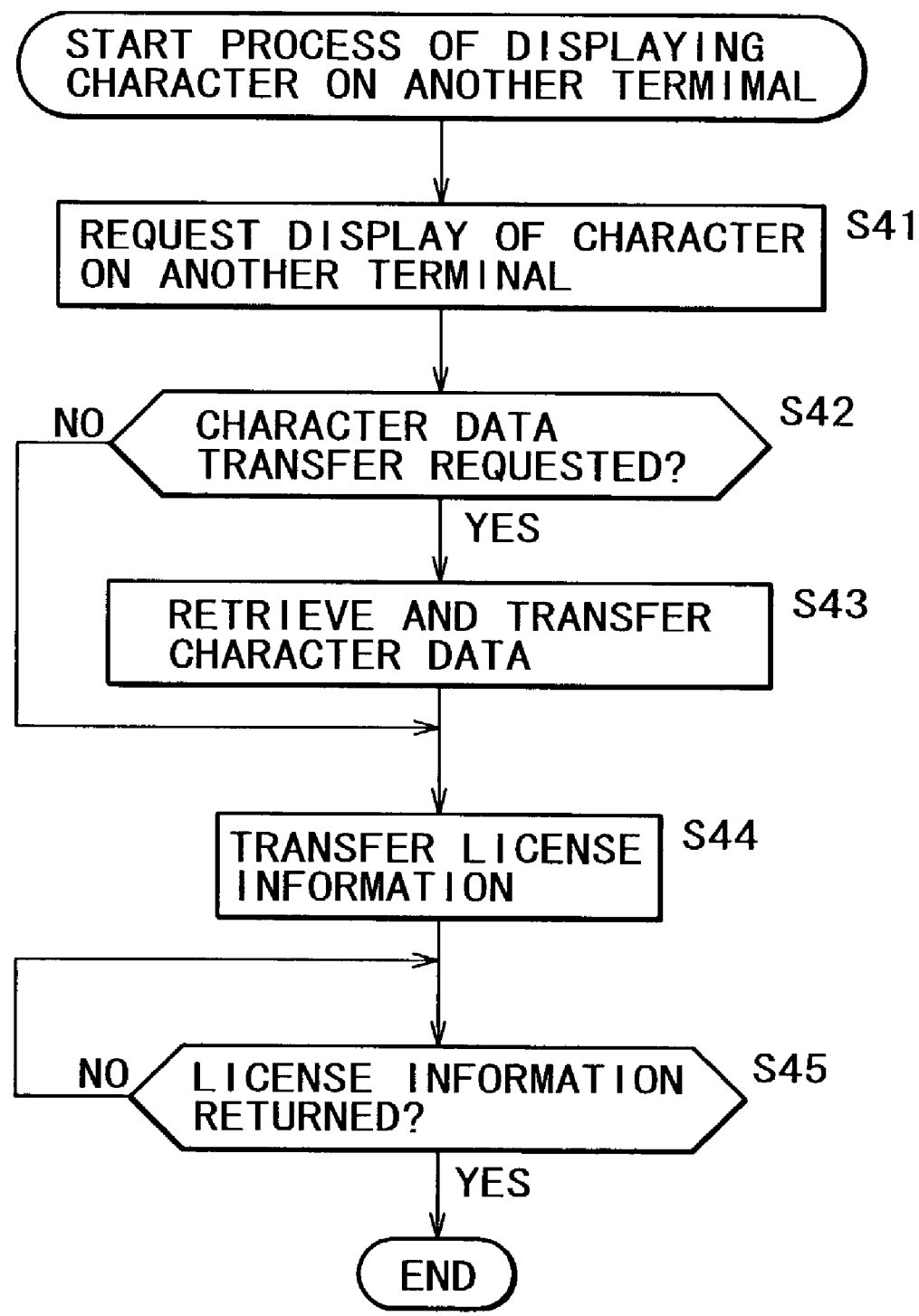
FIG. 6 is a flowchart of steps constituting the process of causing a character to appear on another terminal included in FIG. 1.
Figure 7:
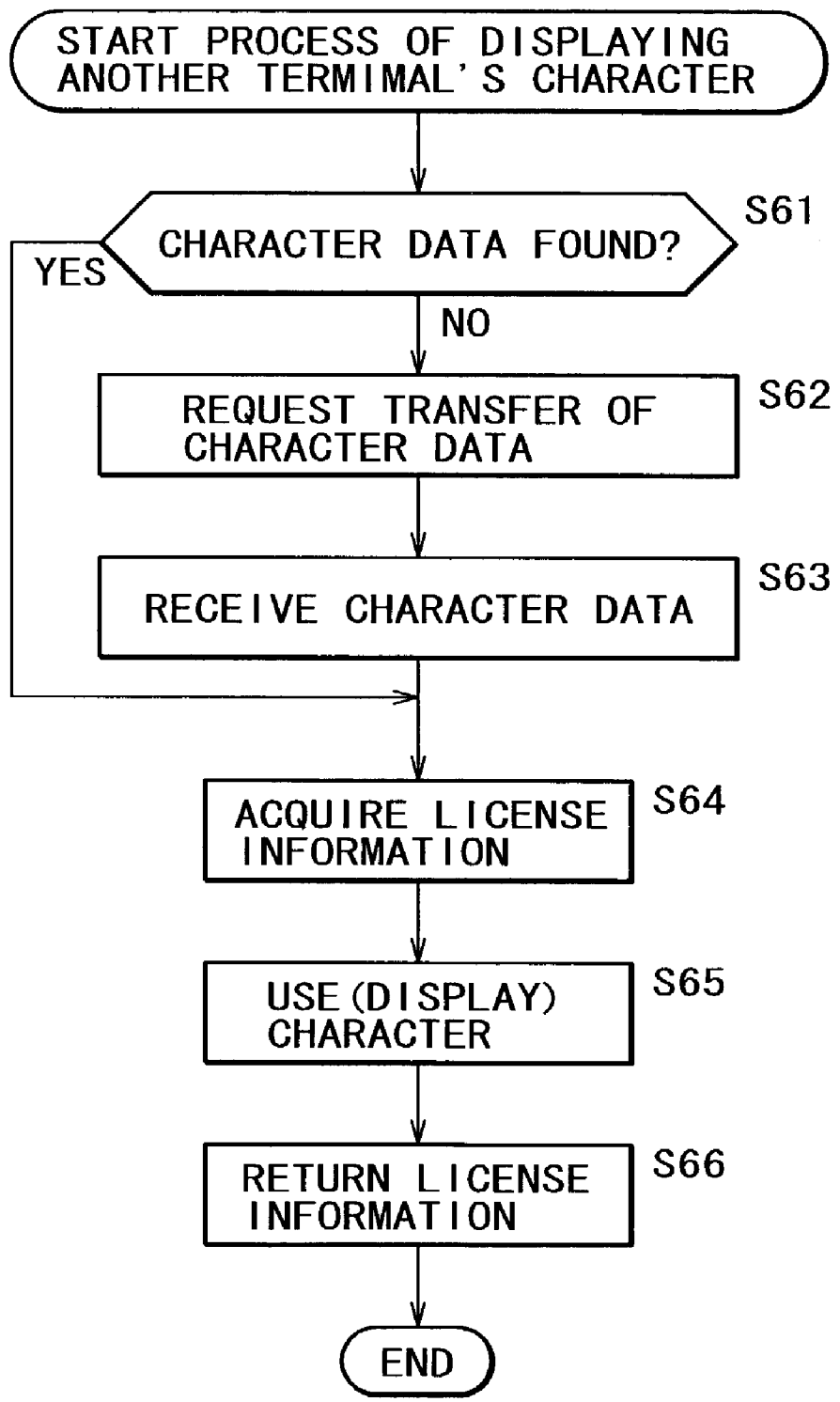
FIG. 7 is a flowchart of steps constituting the process of displaying a character as requested by another terminal in FIG. 1.

With this system, the user at each terminal can utilize the alter-ego character not only when running application programs on the user's own terminal but also when connected to another terminal where the connected user may be represented symbolically on the other terminal by his or her character. FIG. 6 shows steps constituting the process of causing a user's character to appear on another terminal. FIG. 7 depicts steps constituting the process of displaying another user's character as requested by another terminal in keeping with the process of FIG. 6.

Illustratively, the character of the terminal 1-1 is displayed on the terminal 1-2 as follows: in step S41, the CPU 21 of the terminal 1-1 requests the terminal 1-2 to display the character of the terminal 1-1 through the communication unit 29 and over the Internet 2. Given the request, the terminal 1-2 determines whether the character data representative of the terminal 1-1 are retained in the terminal 1-2. If the character data in question are not found, the terminal 1-2 requests transfer of the data from the terminal 1-1, as will be described later (step S62 of FIG. 7). If the character data representing the terminal 1-1 are already held in the terminal 1-2 (i.e., "YES" in the judgment of step S61 in FIG. 7), then the terminal 1-2 does not request the character data transfer.

In step S42, the CPU 21 of the terminal 1-1 judges whether a character data transfer request is received from the terminal 1-2. If the data transfer request is judged received, step S43 is reached. In step S43, the CPU 21 retrieves the character data from the storage unit 28 and causes the communication unit 29 to transmit the retrieved data to the terminal 1-2 over the Internet 2.

If the character data transfer request from the terminal 1-2 is not judged received, then step S43 is skipped.

In step S44, the CPU 21 retrieves from the storage unit 28 the license information granting the right to use the character of the terminal 1-1 and causes the communication unit 29 to transmit the retrieved information to the terminal 1-2 over the Internet 2.

The steps above allow the terminal 1-2 to utilize (i.e., to display) the character of the terminal 1-1. After use (i.e., display), the terminal 1-2 returns the license information to the terminal 1-1 (in step S66 of FIG. 7).

In step S45, the CPU 21 of the terminal 1-1 waits for the license information to be returned from the terminal 1-2. When the information is judged returned, the CPU 21 terminates the processing.

When requested by the terminal 1-1 to display its character, the terminal 1-2 carries out the steps in FIG. 7. In the ensuing description of the process, the structure of the terminal 1-1 in FIG. 2 will be cited as the structure of the terminal 1-2.

In step S61, the CPU 21 of the terminal 1-2 judges whether the storage unit 28 already retains the character data representing the terminal 1-1 that has requested character display. If the character data of the terminal 1-1 are not found in the storage unit 28, step S62 is reached. In step S62, the CPU 21 of the terminal 1-2 requests the terminal 1-1 to transfer the character data through the communication unit 29 and over the Internet 2.

In response to the data transfer request, the terminal 1-1 transfers the character data as described above (step S43 of FIG. 6). In step S63, the CPU 21 of the terminal 1-2 receives the character data sent from the terminal 1-1 through the communication unit 29, and supplies the received data to the storage unit 28 for storage.

If in step S61 the character data are judged already retained in the storage unit 28, then steps S62 and S63 are skipped.

Following transmission of the character data, the license information is also transferred as described above (step S44 of FIG. 6). In step S64, the CPU 21 of the terminal 1-2 acquires the relevant license information from the terminal 1-1 and supplies the acquired information to the storage unit 28 for storage.

In step S65, the CPU 21 makes use of (i.e., displays) the character data retrieved from the storage unit 28 on the basis of the license information acquired in step S64. That is, the CPU 21 displays an appropriate character image on the output unit 27 based on the character data in the storage unit 28. After use (i.e., display), the CPU 21 of the terminal 1-2 goes to step S66 and returns the license information to the terminal 1-1.

The return of the license information is effected by actually transmitting the information from the terminal 1-2 to the terminal 1-1 over the Internet 2 and by deleting the license information from the storage unit 28 of the terminal 1-2. Alternatively, the license information may be deleted from the storage unit 28 of the terminal 1-2 and a signal indicating the erasure of the information may be transmitted from the terminal 1-2 to the terminal 1-1.

Figure 8:
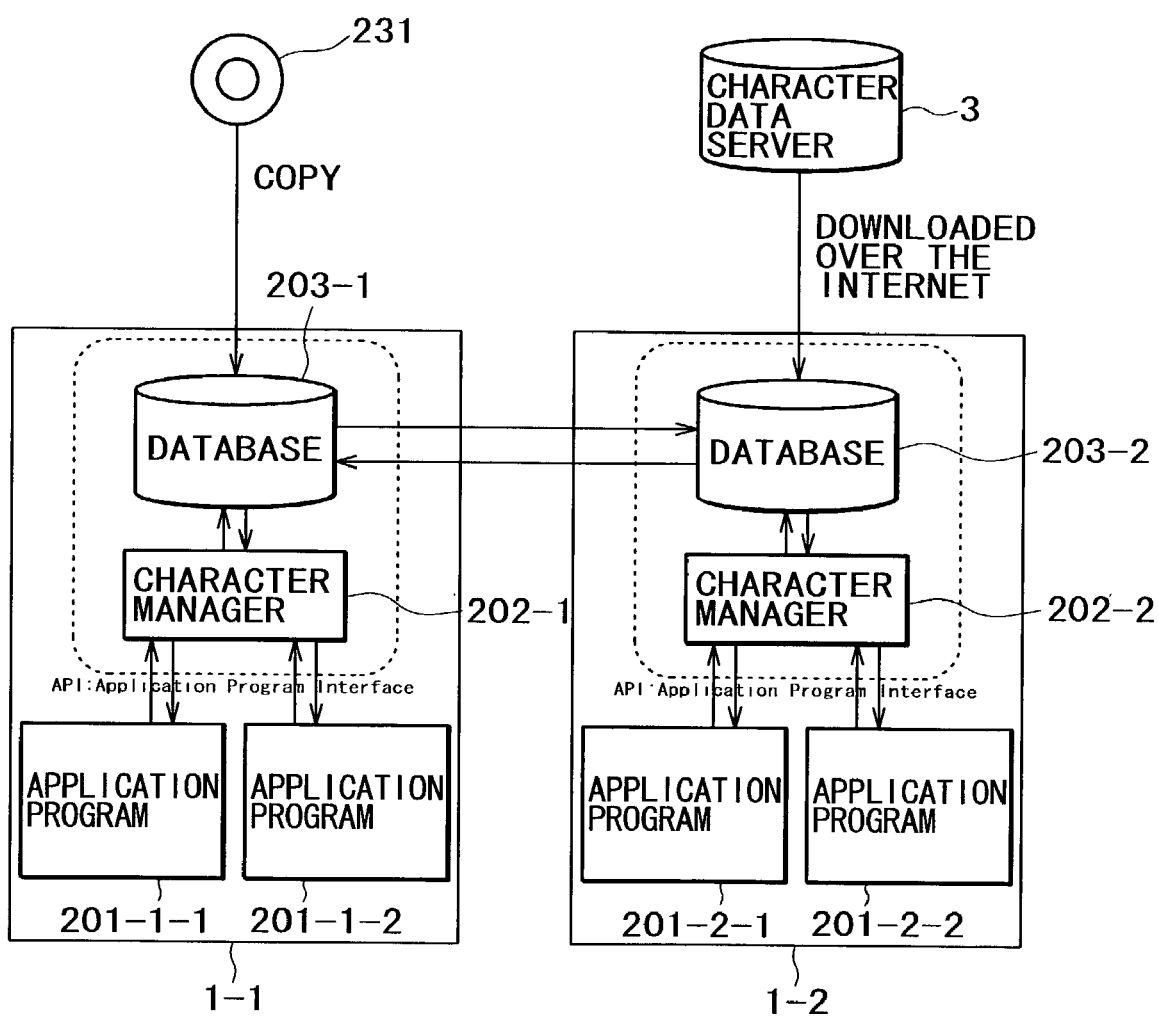
FIG. 8 is an explanatory view showing how each terminal has its character displayed on another terminal.

FIG. 8 schematically shows steps whereby each terminal uses its character and whereby each terminal has its character utilized by another terminal.

In the setup of FIG. 8, the terminal 1-1 acquires character data by making a copy of the data from a storage medium 231 to a database 203-1 (storage unit 28). A character manager 202-1 extracts and outputs the character data by referencing the database 203-1 in keeping with a request from an application program 201-1-1 or 201-1-2. Thereafter, the application programs 201-1-1 and 201-1-2 can perform their processes using the same character.

The terminal 1-2 moves the character data from the character data server 3 into a database 203-2 (storage unit 28). On the terminal 1-2, each of application programs 201-2-1 and 201-2-2 also accesses the database 203-2 through a character manager 202-2, and retrieves from the database 203-2 the appropriate character data for use (i.e., for display).

After the processes in FIGS. 6 and 7, the character data representing the terminal 1-1 and held in its database 203-1 are transferred to the database 203-2 of the terminal 1-2 for storage. Likewise, the character data representing the terminal 1-2 and retained in its database 203-2 are transferred to the database 203-1 of the terminal 1-1 for storage.

The arrangements above allow the terminal 1-1 to use the character of the terminal 1-2 by acquiring the concomitant license information, and enable the terminal 1-2 to utilize the character of the terminal 1-1 by acquiring the applicable license information.

Figure 9:
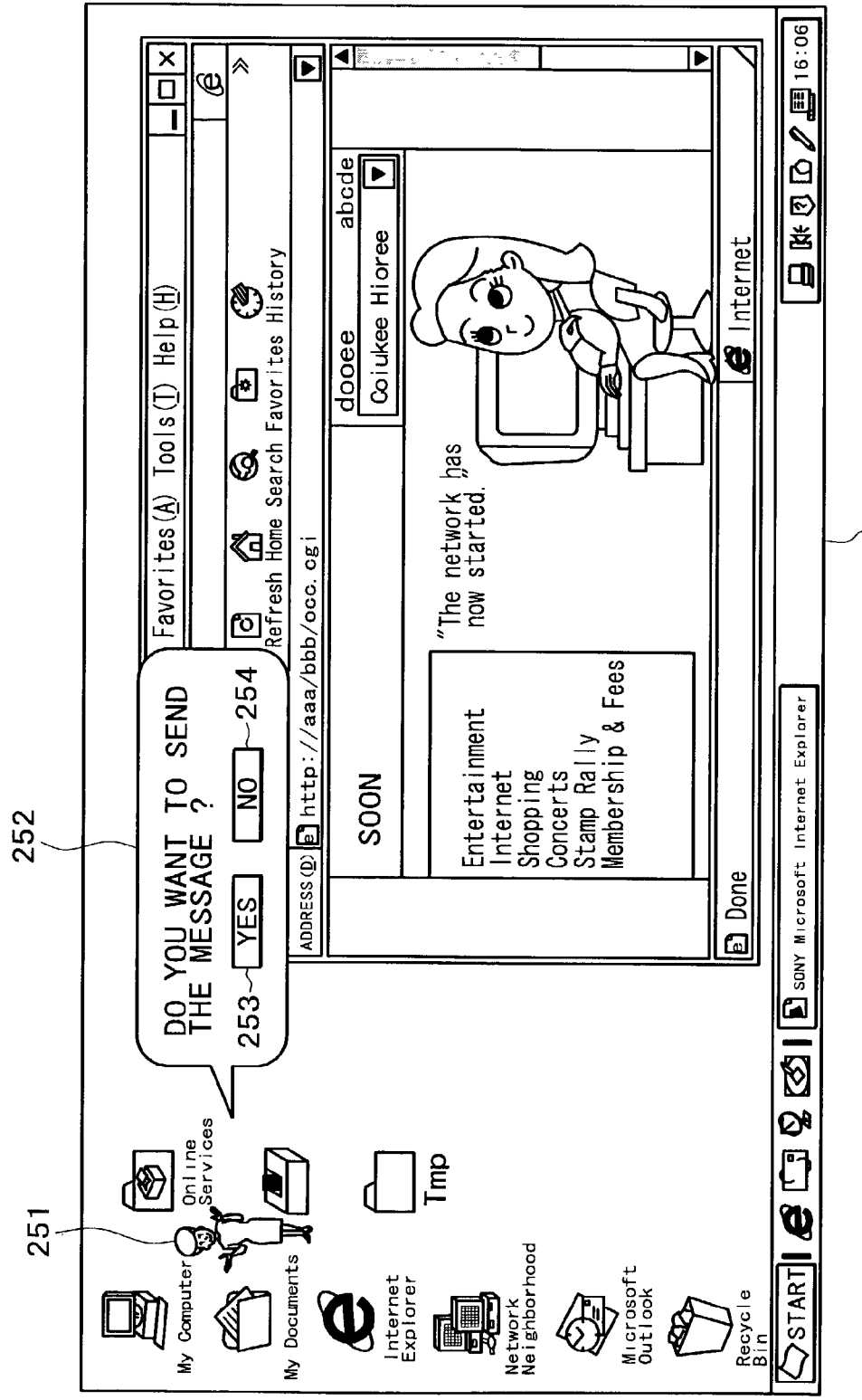
FIG. 9 is a schematic view of a typical user-representing character being displayed.

FIG. 9 is a schematic view of a typical character being displayed by the application program 201-1-1 on the terminal 1-1. More specifically, the application program 201-1-1 acting as a mail program gains access to the database 203-1 through the character manager 202-1, acquires character data from the database 203-1, and displays a suitable character constituted by the acquired character data in a window managed by the application program 201-1-1.

In the example of FIG. 9, an e-mail message ready to be sent is pointed to by a character 251 along with a balloon 252. The balloon 252 contains a message "Do you want to send the message?" together with a "YES" button 253 and a "NO" button 254. When transmitting the message, the user at the terminal 1-1 clicks on the "YES" button using the mouse constituting part of the input unit 26; when not transmitting the message for the moment, the user clicks on the "NO" button 254.

If the "YES" button 253 is clicked on, the application program 201-1-1 causes the mail server 4 to transmit the e-mail to its destination. If the "NO" button 254 is clicked on, the application program 201-1-1 does not effect the transmission.

Transactions between the character manager 202-1 on the one hand and the application programs 201-1-1 and 201-1-2 on the other hand are interfaced by an API (Application Program Interface).

Figure 10:
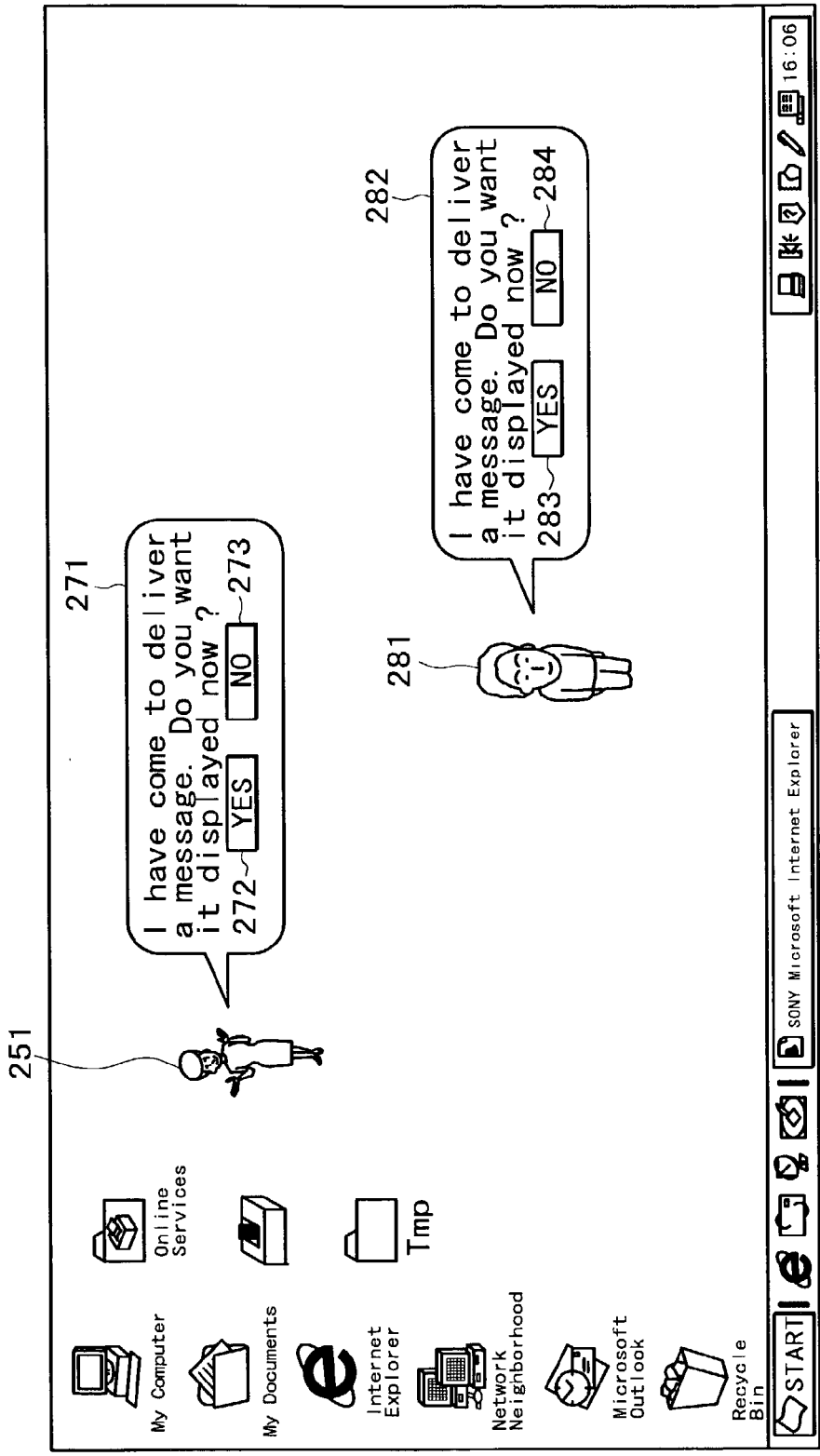
FIG. 10 is a schematic view of a typical display screen on another terminal.

FIG. 10 is a schematic view of a typical character display screen on the terminal 1-2. In this display example, e-mails are shown transmitted from the terminals 1-1 and 1-3 accompanied by their respective characters 251 and 281 together with balloons 271 and 282. The balloons 271 and 282 each contain a message "I have come to deliver a message. Do you want it displayed now?" along with a YES button (272, 283) and a NO button (273, 284).

The user at the terminal 1-2 may click on the YES button 272 or 283 to display the e-mail from the user at the terminal 101 or 103. If the NO button 273 or 284 is clicked on, the e-mail is not displayed.

In the processes above, each terminal was shown retaining character data in the database 203-1 or 203-2. However, if transmissions over the Internet 2 are sufficiently rapid, the purchased character data may not only be transferred from the character data server 3-1 or 3-2 to the character manager 202-1 or 202-2 of each terminal, but also be supplied, if required by any other terminal, from the applicable character data server directly to the terminal in question over the internet 2, as shown in FIG. 11.

Figure 11:
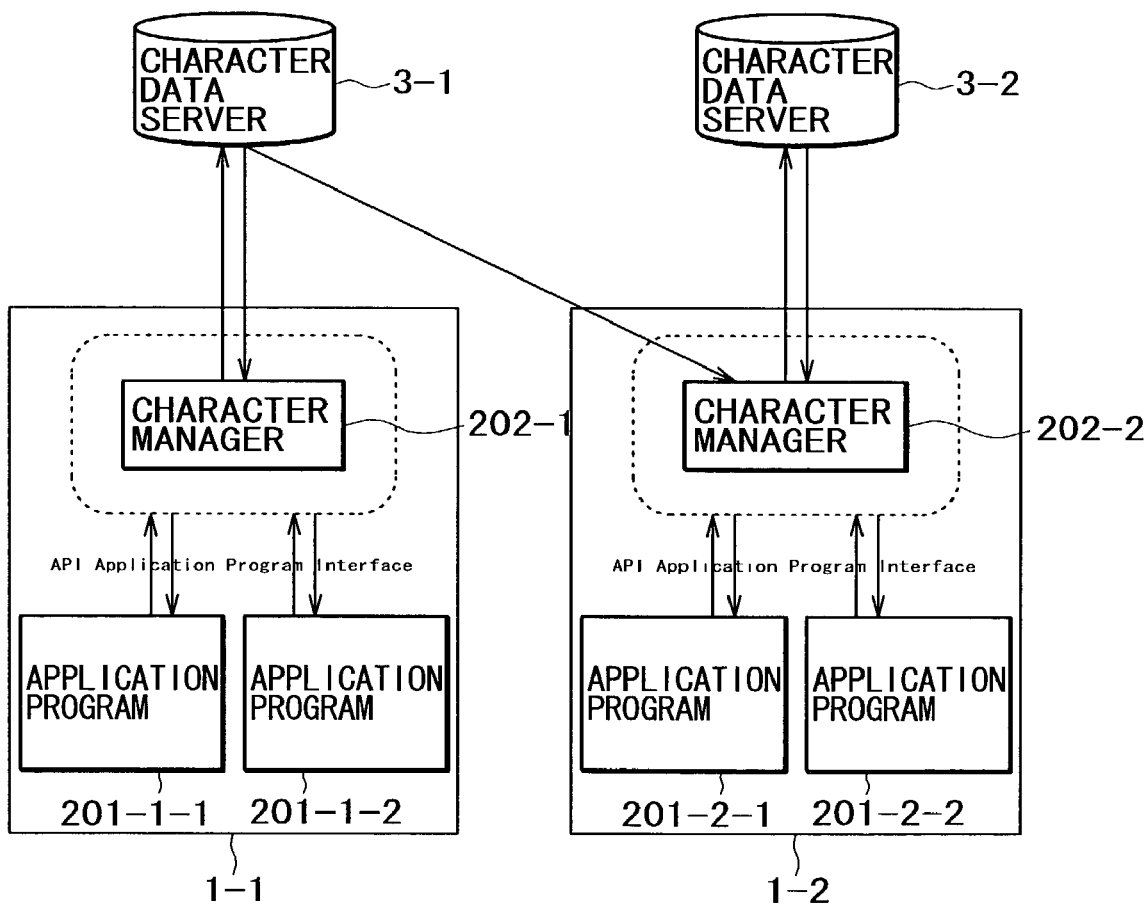
FIG. 11 is an explanatory view depicting how character data are supplied.

In the example of FIG. 11, the character data of the terminal 1-1 are supplied from the character data server 3-1 (which manages the character data of the terminal 1-1) directly to the character manager 202-2 of the terminal 1-2.

Figure 12:
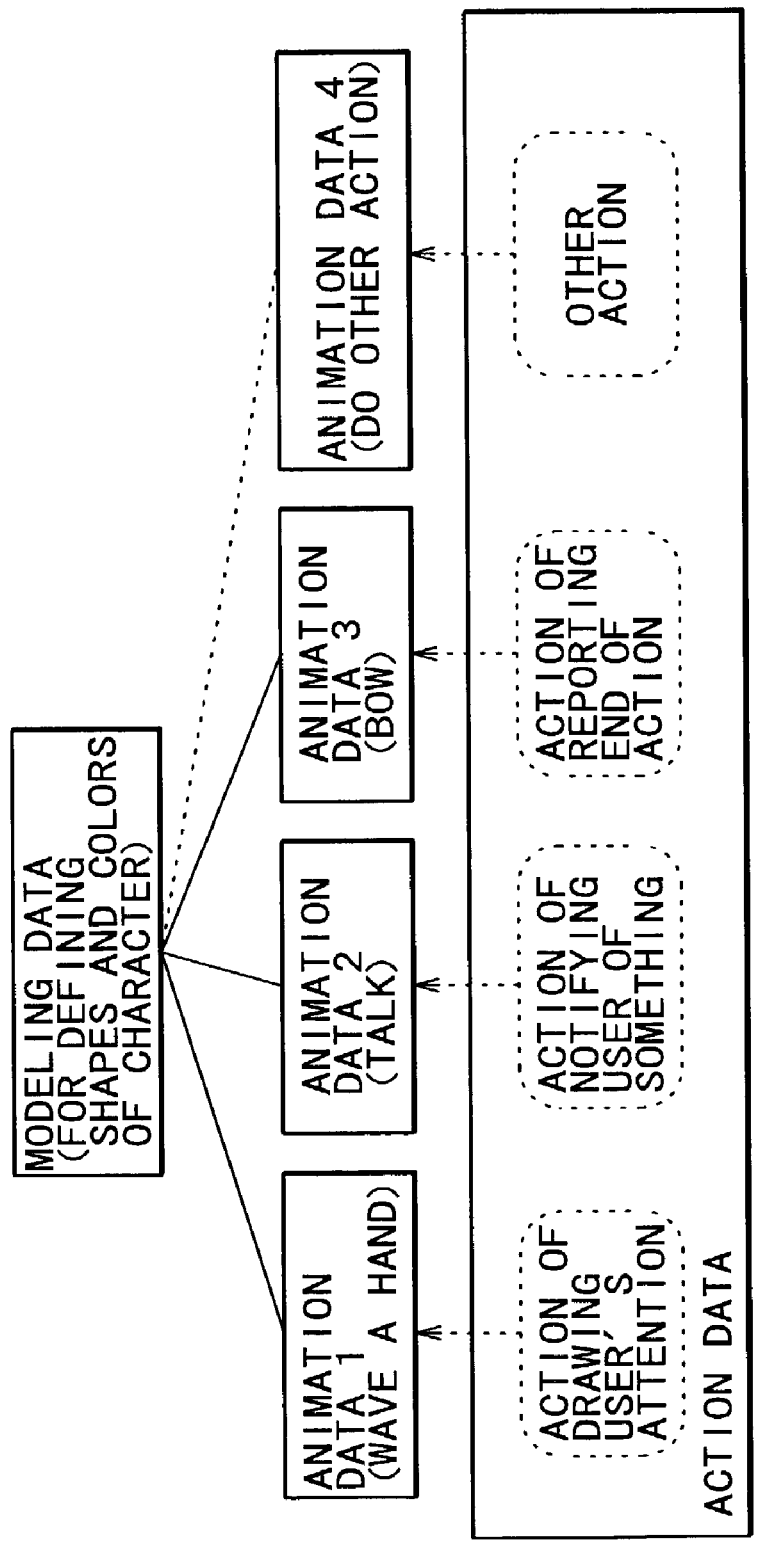
FIG. 12 is an explanatory view illustrating how character data are structured.

A representative character data structure will now be described. The character data used in the above examples are typically constituted by modeling data, animation data, and action data, as illustrated in FIG. 12. The modeling data define shapes and colors of each character. One character is provided with a single set of modeling data. The animation data define a movement of some members (e.g., arms, legs, head) of the character defined by the modeling data. In the example of FIG. 12, the modeling data is accompanied by four sets of animation data defining four actions: "wave a hand," "talk," "bow" and "do other action."

The action data define GUI (Graphical User Interface) operations, as viewed from each application program, in accordance with the different sets of animation data. In the example of FIG. 12, the "wave a hand" animation data correspond to action data representing the action of drawing the user's attention; the "talk" animation data, to action data defining the action of notifying the user of something; and the "bow" animation data, to action data determining the action of reporting an end of action.

Figure 13:
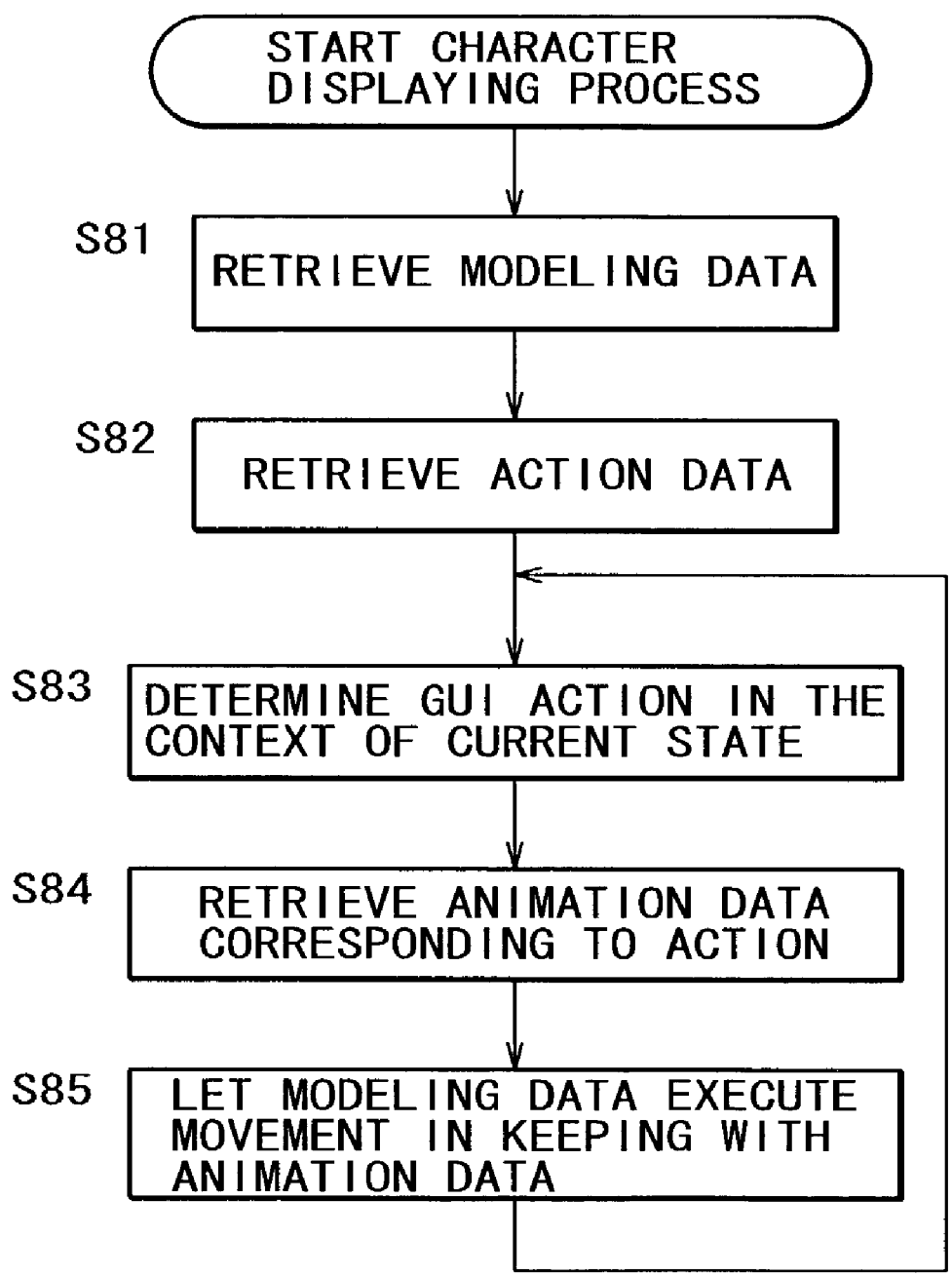
FIG. 13 is a flowchart of steps constituting a character displaying process.

Described below with reference to the flowchart of FIG. 13 is how a character is displayed by each application program.

In step S81, the application program retrieves modeling data. In step S82, the application program retrieves action data. In step S83, the application program determines a GUI action reflecting the retrieved action data in the context of the current state. In step S84, the application program retrieves animation data corresponding to the action determined in step S83. In step S85, the application program processes the modeling data retrieved in step S81 in accordance with the animation data retrieved in step S84, causing the character to execute a predetermined movement. Step S83 is then reached again, and the subsequent steps are repeated.

The series of steps described above may be carried out either by hardware or by software. For software-based processing to take place, programs constituting the software may be either incorporated beforehand in dedicated hardware of a computer or installed upon use from a suitable program storage medium into a general-purpose personal computer or like equipment capable of executing diverse functions.

As shown in FIGS. 2 and 3, the storage medium constitutes not only as a package medium, which is offered to users apart from the apparatus, such as the magnetic disc 41 or 141 (including flexible discs); optical disc 42 or 142 (including CD-ROM (Compact Disc-Read Only Memory) and DVD (Digital Versatile Disc)); magneto-optical disc 43 or 143 (including MD (Mini-Disc)); or semiconductor memory 44 or 144; but also in the form, which are offered to users by incorporating beforehand in the apparatus, such as the ROM 22 or 122, or the hard disc included in the storage unit 28 or 128, each medium containing the programs.

In this specification, the steps about the programs to be stored in the storage medium represent not only the processes that are carried out in the depicted sequence (i.e., on a time series basis) but also processes that are conducted parallelly or individually.

In this specification, the term "system" refers to an entire configuration made up of a plurality of component devices.

Where the information processing apparatus, information processing method, and program according to the invention are in use as described, the character data defined by character-designating information are transmitted between terminals over a network. The inventive resources help to construct rapidly a system that allows each of its numerous terminals to utilize a terminal-specific, user-representing character in unified fashion throughout the configured terminals.

Furthermore, through the use of the information processing apparatus, information processing method, and program according to the invention, the license information granting the right to use a given character is transmitted from one information processing apparatus to another. After use of the character, the license information is returned to the originating apparatus. This enables each of the interconnected information processing apparatuses to use its unique character throughout the apparatuses while ensuring copyright protection.

While a preferred embodiment of the invention has been described using specific terms, such description is for illustrative purposes only, and it is to be understood that changes and variations may be made without departing from the spirit or scope of the following claims.

What is claimed is:

1. An information processing apparatus comprising:
   accepting means for accepting an access request from a terminal over a network;
   first acquiring means for acquiring character-designating information unique to said terminal, which designates a character not to be sold to other users and which is received over said network;
   second acquiring means for acquiring character data constituting said character designated by the character-designating information acquired by said first acquiring means; and
   transmitting means for transmitting to said terminal over said network said character data acquired by said second acquiring means, for transmitting license information to said terminal granting a right to use said character data, and for transmitting to other terminals other character data when said other terminals request said other character data;
   wherein said license information is transmitted by said terminal to said other terminals on the network for enabling use of the character data of said terminal as identification data to uniquely identify said terminal to the other terminals on the network, based on a visual recognition of the character data, and
   wherein the character data is used for identifying said terminal in a plurality of different application programs on each of said other terminals.

2. The information processing apparatus according to claim 1, further comprising:
   billing means for executing a billing process regarding said character data and/or said license information transmitted by said transmitting means.

3. The information processing apparatus according to claim 1,
   wherein said character data comprise first data, second data and third data,
   wherein said first data defines a shape of said character, said second data defines a movement of a member of said character, and said third data defines a GUI action as viewed from an application program.

4. An information processing method for use with an information processing apparatus connected to a terminal via a network, said information processing method comprising the steps of:
   accepting an access request from said terminal over said network;
   firstly acquiring character-designating information unique to said terminal, which designates a character not to be sold to other users and which is received over said network;
   secondly acquiring character data constituting said character designated by the character-designating information acquired in said first acquiring step;
   transmitting, to said terminal over said network, said character data designated by the character-designated information acquired in said second acquiring step;
   transmitting, to said terminal over said network, license information granting a right to use said character data; and
   transmitting to other terminals other character data when said other terminals request said other character data,
   wherein said license information is transmitted by said terminal to said other terminals on the network for enabling use of the character data of said terminal as identification data to uniquely identify said terminal to the other terminals on the network, based on a visual recognition of the character data, and
   wherein the character data is used for identifying said terminal in a plurality of different application programs on each of said other terminals.

5. A computer-readable medium storing a program for use with a computer which controls an information processing apparatus connected to a terminal via a network, said program causing said computer to execute the steps of:
   accepting an access request from said terminal over said network;
   firstly acquiring character-designating information unique to said terminal which designates a character not to be sold to other users and which is received over said network;
   secondly acquiring character data constituting said character designated by the character-designating information acquired in said first acquiring step;
   transmitting to said terminal over said network said character data designated by the character-designating information acquired in said second acquiring step;
   transmitting, to said terminal over said network, license information granting a right to use said character data; and
   transmitting to other terminals other characters data when said other terminals request said other character data,
   wherein said license information is transmitted by said terminal to said other terminals on the network for enabling use of the character data of said terminal as identification data to uniquely identify said terminal to the other terminals on the network, based on a visual recognition of the character data, and
   wherein the character data is used for identifying said terminal in a plurality of different application programs on each of said other terminals.

6. An information processing apparatus connected to a second information processing apparatus via a network, said information processing apparatus comprising:
   requesting means for requesting said second information processing apparatus, via said network, use a character which is not sold to other users and is unique to said information processing apparatus;
   first storing means for storing license information granting the right to use said character;
   transmitting means for transmitting, to said second information processing apparatus over said network, said license information stored in said first storing means; and
   returning means for performing a returning process regarding said license information transmitted by said transmitting means, wherein said license information is transmitted by said information processing apparatus to said second information processing apparatus on the network for enabling use of the character data as identification data to uniquely identify said information processing apparatus to the second information processing apparatus on the network, based on a visual recognition of the character data, and wherein the character data is used for identifying said information processing apparatus in a plurality of different application programs on said second information processing apparatus.

7. The information processing apparatus according to claim 6, further comprising:

second storing means for storing character data constituting said character, wherein said transmitting means further transmits to said second information processing apparatus over said network said character data stored by said second storing means.

8. An information processing method for use with an information processing apparatus connected to a second information processing apparatus via a network, said information processing method comprising the steps of:

requesting said second information processing apparatus via said network to use a character which is not sold to other users and is unique to said information processing apparatus;

storing license information granting the right to use said character;

transmitting to said second information processing apparatus over said network said license information stored in said storing step; and performing a returning process regarding said license information transmitted in said transmitting step, wherein said license information is transmitted by said information processing apparatus to said second information processing apparatus on the network for enabling use of the character data of said information processing apparatus as identification data to uniquely identify said information processing apparatus to the second information processing apparatus on the network, based on a visual recognition of the character data, and wherein the character data is used for identifying said information processing apparatus in a plurality of different application programs on said second information processing apparatus.

9. A computer-readable medium storing a program for use with a computer which controls an information processing apparatus connected to a second information processing apparatus via a network, said program causing said computer to execute the steps of:

requesting said second information processing apparatus via said network to use a character which is not sold to other users and is unique to said information processing apparatus;

storing license information granting the right to use said character;

transmitting to said second information processing apparatus over said network said license information stored in said storing step; and performing a returning process regarding said license information transmitted in said transmitting step, wherein said license information is transmitted by said information processing apparatus to said second information processing apparatus on the network for enabling use of the character data of said information processing apparatus as identification data to uniquely identify said information processing apparatus to the second information processing apparatus on the network, based on a visual recognition of the character data, and wherein the character data is used for identifying said information processing apparatus in a plurality of different application programs on said second information processing apparatus.

10. The information processing apparatus according to claim 1, wherein the character data is used for identifying said terminal in a plurality of different application programs on said terminal.

11. The information processing method according to claim 4, further comprising the step of using the character data for identifying said terminal in a plurality of different application programs on said terminal.

12. The computer-readable medium according to claim 5, further executing the step of using the character data for identifying said terminal in a plurality of different application programs on said terminal.

13. The information processing apparatus according to claim 6, wherein the character data is used for identifying said information processing apparatus in a plurality of different application programs on said information processing apparatus.

14. The information processing method according to claim 8, further comprising the step of using the character data for identifying said information processing apparatus in a plurality of different application programs on said information processing apparatus.

15. The computer-readable medium according to claim 9, further executing the step of using the character data for identifying said information processing apparatus in a plurality of different application programs on said information processing apparatus.

16. An information processing system comprising:

a plurality of terminals;

a network; and a character data apparatus;

wherein said character data apparatus includes an accepting means for accepting access requests from said plurality of terminals over the network, storage means for storing a plurality of character and license information thereof, wherein no character is sold in duplicate to different users, and transmitting means for transmitting character and license information to said plurality of terminals when purchased, wherein each terminal includes, acquiring means for acquiring a character and license information, from said character data apparatus, which is unique for each said terminal, and transmitting means for transmitting said license information to other terminals on the network for enabling use of the character data of said terminal to uniquely identify said terminal based on visual recognition of the character, and wherein the character is used for identifying said terminal in a plurality of different application programs on each of said other terminals.

* * * * *